US007441160B2

(12) United States Patent
Hunt

(10) Patent No.: US 7,441,160 B2
(45) Date of Patent: Oct. 21, 2008

(54) FILE SYSTEM FOR A STAGE LIGHTING ARRAY SYSTEM

(75) Inventor: Mark A. Hunt, Derby (GB)

(73) Assignee: Production Resource Group, L.L.C., New Windsor, NY (US)

( * ) Notice: Subject to any disclaimer, the term of this patent is extended or adjusted under 35 U.S.C. 154(b) by 24 days.

(21) Appl. No.: 11/687,593

(22) Filed: Mar. 16, 2007

(65) Prior Publication Data

US 2007/0168862 A1 Jul. 19, 2007

Related U.S. Application Data

(62) Division of application No. 10/913,022, filed on Aug. 6, 2004, now Pat. No. 7,290,895.

(60) Provisional application No. 60/493,862, filed on Aug. 8, 2003.

(51) Int. Cl.

| | |
|---|---|
| ***G06F 11/00*** | (2006.01) |
| ***G06F 3/00*** | (2006.01) |
| ***G05B 11/01*** | (2006.01) |
| ***F21V 33/00*** | (2006.01) |
| ***F21V 19/02*** | (2006.01) |
| ***B60Q 1/124*** | (2006.01) |
| ***G03B 21/30*** | (2006.01) |
| ***G03B 21/20*** | (2006.01) |
| ***H05B 37/00*** | (2006.01) |
| ***H05B 39/00*** | (2006.01) |
| ***H05B 41/00*** | (2006.01) |

(52) U.S. Cl. ........................... 714/57; 715/740; 700/17; 700/19; 362/85; 362/233; 362/285; 362/301; 353/72; 353/85; 315/316

(58) Field of Classification Search ................... 714/57; 715/735, 740, 760, 771; 700/3, 17, 19, 286, 700/295, 297; 362/85, 233, 285, 286, 301; 353/62, 72, 85; 345/6, 423; 315/189, 291, 315/312, 316–318, 362

See application file for complete search history.

(56) References Cited

U.S. PATENT DOCUMENTS

| | | | |
|---|---|---|---|
| 5,061,997 | A | 10/1991 | Rea et al. |
| 5,769,527 | A | 6/1998 | Taylor et al. |
| 5,812,422 | A | 9/1998 | Lyons |
| 5,940,049 | A | 8/1999 | Hinman et al. |
| 5,969,485 | A | 10/1999 | Hunt |
| 5,983,280 | A | 11/1999 | Hunt |
| 6,029,122 | A | 2/2000 | Hunt |
| 6,175,771 | B1 | 1/2001 | Hunt et al. |
| 6,429,867 | B1 | 8/2002 | Deering |

(Continued)

FOREIGN PATENT DOCUMENTS

| | | |
|---|---|---|
| JP | 2003068473 | 3/2003 |

*Primary Examiner*—Crystal Barnes Bullock
(74) *Attorney, Agent, or Firm*—Law Office SC Harris

(57) ABSTRACT

A file system for a stage lighting system that maintains the different files associated with the stage lighting system. Each of the files that can represent an effect are maintained within the system within a configuration file. The configuration file can be updated on each start of the system so that the system can maintain information indicative of current configuration files. A test mode can also be entered in which a pre-formed show can be tested against the current state of the configuration files.

13 Claims, 3 Drawing Sheets

U.S. PATENT DOCUMENTS

| | | | | |
|---|---|---|---|---|
| 6,538,797 | B1 | 3/2003 | Hunt | |
| 6,548,967 | B1 | 4/2003 | Dowling et al. | |
| 6,549,326 | B2 | 4/2003 | Hunt et al. | |
| 6,563,520 | B1 * | 5/2003 | Parker et al. | 715/771 |
| 6,597,132 | B2 | 7/2003 | Hunt et al. | |
| 6,622,053 | B1 * | 9/2003 | Hewlett et al. | 700/19 |
| 6,765,544 | B1 | 7/2004 | Willson et al. | |
| 6,774,584 | B2 | 8/2004 | Lys et al. | |
| 6,801,353 | B2 | 10/2004 | Hunt et al. | |
| 6,891,656 | B2 | 5/2005 | Hunt | |
| 6,894,443 | B2 | 5/2005 | Hunt et al. | |
| 6,922,679 | B2 | 7/2005 | Watkins et al. | |
| 7,057,797 | B2 | 6/2006 | Hunt | |
| 7,139,617 | B1 | 11/2006 | Morgan et al. | |
| 7,148,632 | B2 | 12/2006 | Berman et al. | |
| 7,161,562 | B1 | 1/2007 | Hunt et al. | |
| 7,231,060 | B2 * | 6/2007 | Dowling et al. | 382/100 |
| 7,242,152 | B2 * | 7/2007 | Dowling et al. | 315/291 |
| 7,310,629 | B1 * | 12/2007 | Mendelson et al. | 707/3 |
| 2002/0078221 | A1 | 6/2002 | Blackwell et al. | |
| 2004/0160198 | A1 | 8/2004 | Hewlett et al. | |
| 2004/0252486 | A1 | 12/2004 | Krause | |
| 2005/0057543 | A1 | 3/2005 | Hunt et al. | |
| 2005/0083487 | A1 | 4/2005 | Hunt et al. | |
| 2005/0086589 | A1 | 4/2005 | Hunt | |
| 2005/0094635 | A1 | 5/2005 | Hunt | |
| 2005/0190985 | A1 | 9/2005 | Hunt | |
| 2005/0200318 | A1 | 9/2005 | Hunt et al. | |
| 2005/0206328 | A1 | 9/2005 | Hunt | |
| 2005/0207163 | A1 | 9/2005 | Hunt | |
| 2005/0213335 | A1 | 9/2005 | Hunt | |
| 2006/0158461 | A1 | 7/2006 | Reese et al. | |
| 2006/0187532 | A1 | 8/2006 | Hewlett et al. | |
| 2006/0227297 | A1 | 10/2006 | Hunt | |

* cited by examiner

FILE SYSTEM FOR A STAGE LIGHTING ARRAY SYSTEM

CROSS-REFERENCE TO RELATED APPLICATIONS

This application is a divisional of U.S. patent application Ser. No. 10/913,022, filed Aug. 6, 2004 now U.S. Pat. No. 7,290,895; which claims benefit of the priority of U.S. Provisional Application Ser. No. 60/493,862 filed Aug. 8, 2003 and entitled "File System for a Stage Lighting Array System."

BACKGROUND

Stage lighting systems may be extremely complex. A typical system may include a console which controls a number of different lighting systems. Each lighting system may be a self-contained system, or may be a computer-based box that controls an external system. Many complicated effects are often carried out during the show. The complicated effects require knowledge of the files that actually exist within each lamp.

SUMMARY

The present system defines a special file system and discovery mechanism for automatically determining the content of certain files in a display system of a type adapted for digital control of an external projector.

DETAILED DESCRIPTION

Figure 1:
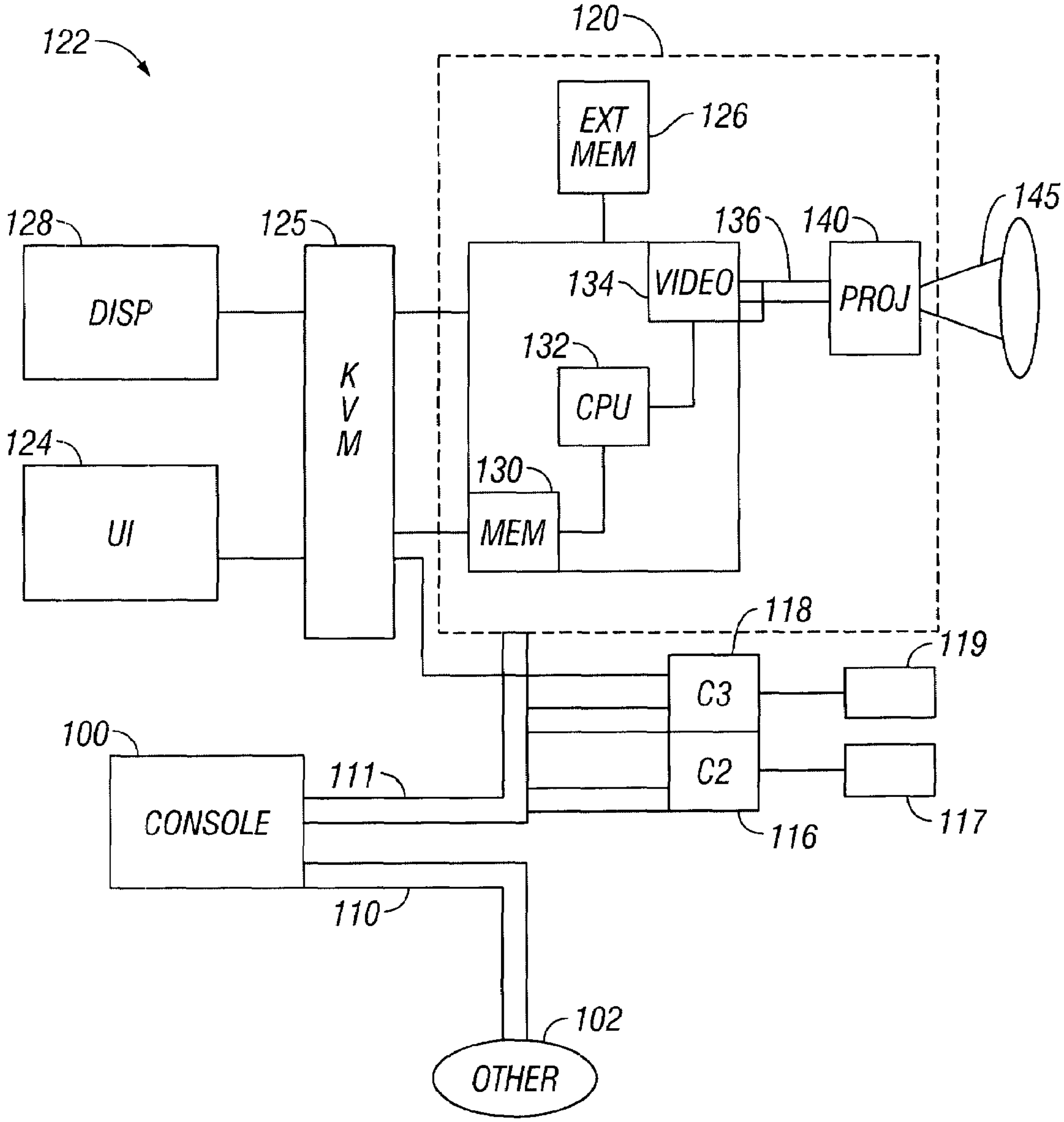
FIG. 1 shows a block diagram of the overall system.

A block diagram of the basic system is shown in FIG. 1. A number of lights collectively form a "show", with the number of lights typically being between 5 and 200 lights, although there is no actual limit on the number of lights that can form a show. Effects being produced by all of these lights are controlled by the console 100, under control of a lighting designer or operator. The console may produce one or many outputs which collectively control the array of lights. In FIG. 1, the line 111 is shown connected from console 100, to control a first light assembly 120 which is explained in further detail. The line 110 is shown as controlling other lights shown generically as 102; where it should be understood that there are at least 2 lights, and more typically between 5 and 200 lights in the overall show. In an embodiment, the controlling line 110 may be a control using ethernet protocol.

The actual light 120 being controlled by the control line 102 is an M BOX (TM) light made by Light and Sound Design, Ltd. The M BOX is formed of a computer part 122 which is programmed with suitable programs as described herein, a user interface 124, an external memory source 126, and a display 128. In a preferred embodiment, a keyboard switch or KVM switch 125 is used so that the user interface 124 and display 128 may be used in common for all of a multiplicity of different computer units 122,116 & 118.

The computer part 122 also includes its own internal memory 130, which stores both programs which are used for image processing, and also stores prestored gobos and effects to be used by the light. For example, the memory 130 may store video clips, as well as a number of different shapes, and may store specified libraries from different gobo manufacturers. The gobo shapes may be used to shape the outer shape of the light beam being projected. In an embodiment, the final effect produced by the light may be a combination of a number of different layers, and the shape of the layer may also be controlled by the images stored in memory 130.

The computer part 122 also includes a processor shown as CPU 132, and a video card 134. All of these may be off-the-shelf items. The CPU 132 operates based on the programs stored in memory 130 to produce a video output using video card 134. The video output 136 is connected to an external projector 140. In an embodiment, this projector 140 may be a projector which is digitally controllable, which is to say that each of a plurality of digital bits forming the image is separately controllable for brightness, color and other aspects such as duty cycle. For example, the projector 140 may be a digital micromirror based device or DMD, also referred to as a digital light processor based device. The projector produces an output effect 145 which is used for part of the show. For example, the effect 145 may be projected onto the stage.

As explained above, there be may be a number of computer units 122 controlled by the common user interface 124 and display 128, and also controlled by the ethernet control signal 102. In this embodiment, two additional computer units 116 and 118 are shown, each also controlling external projectors 117, 119 to produce other lighting effects.

In operation, the CPU 132 operates according to a stored program to carry out certain operations based on the basic shapes and effects which are stored in the memory 130. For example, the CPU 132 typically controls a number of different layers collectively forming the image which is used to control the projector. Each of these layers may define shape, color and movement. The movements can be rotations or can be more complicated movements. One layer may cover any other layer or may add to or subtract from any of the other layers. The combined images, as controlled in this way, form a composite image 136 which is used to control the projector.

Figure 2:
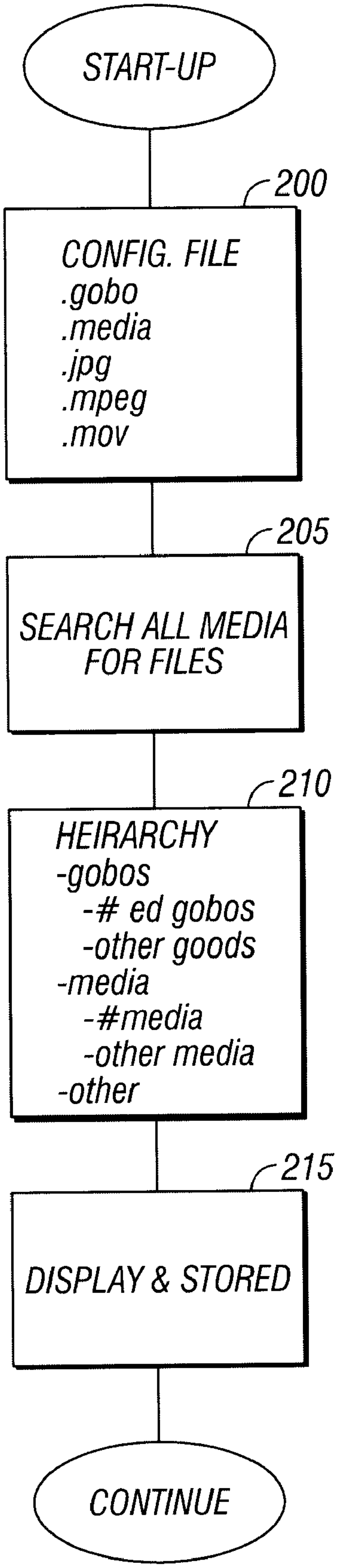
FIG. 2 shows a flowchart of operation of the stored a routine which automatically indexes the kinds of files which can be used.

The images may be stored in memory as libraries, or may be part of external memory 126 that is added to the libraries. The CPU 132, however, needs to know which images it can use. Accordingly, the CPU executes the routine shown in FIG. 2 at startup. This routine enables the system to look for all of the different files and effects which can be used during the operation.

At 200, the device looks for its configuration file. The configuration file defines which kinds of files to look for in the system. Typical files may be files of type "gobo", type "media", as well as more conventional types such as JPEG and MPEG files may be used. In addition, the user can specify different types of files. The type of gobo in the type "media" are special files for use with the M BOX system. The "gobo" file comprises compiled code representing an effect of a gobo, which may comprise an image which is compiled to include a certain effect.

At 205, the processor searches all the memory media which may include memory 130, as well as external memory 126, for all files of the specified types. This search may use an indexing technique for faster results. For example, the indexing technique may index all files on the memory 130 during spare time of the computer 122. Any file which is added after the index, of course, needs to be searched separately and otherwise the system simply searches the index. A similar indexing technique may be used for external memory 126 by using a serial number of the external memory; that is, by using a unique identifying code referring to the removable memory. The external memory may be a removable memory such as a memory stick or like nonvolatile memory, or a CD or DVD drive.

At 210, the CPU makes a list of all the found files, and arranges them in a specified hierarchy. In one preferred hierarchy, a hyperlinked list, for example, in XML, is formed. The list may show the basic overall categories such as gobos, media, and others. Clicking on any item on the list may produce a sublist. Under the gobos, there is a sublist for numbered gobos, and other gobos. The basic gobos in the library may be named according to a 16-bit gobo number which uniquely identifies the gobo as part of the library. However, gobos may also be named as different things, hence the external gobos may be other gobos. Similarly, media may be numbered in a similar way, and numbered media and other media may be separately identified. Clicking on any item, such as the numbered gobos, can bring up the list of gobos or may bring up a sublist of the different gobos.

The file names associated with the gobos may also include MetaTag information, and that MetaTag information may be viewable as part of the XML hierarchy. In addition, the hierarchy shown in 210 may optionally include thumbnails or may include the light showing certain information about the gobos in the media. For example, for gobos, the thumbnail may show the basic shape of the gobo. The thumbnails may be automatically produced as a preview, or may be entered by a user as part of the meta tag information. The other information, which is shown as part of the hierarchy, may be any other feature which can be used to effect the output video produced at 134. For example, different effects which can be added to gobos can be compiled and stored as a file. The different effects may be specified types of rotation, shaping, and other such effects.

Basically any effect which can be used on an image can be compiled as one of the other effects.

The Meta Tag information and/or thumbnail information can include some information about the different gobos which are used. This hierarchy of files is displayed to the user at 215, and may be also stored in a specified location so that the user can call up the XML file at any point. In this way, a user can find the different files which exist on the system.

Figure 3:
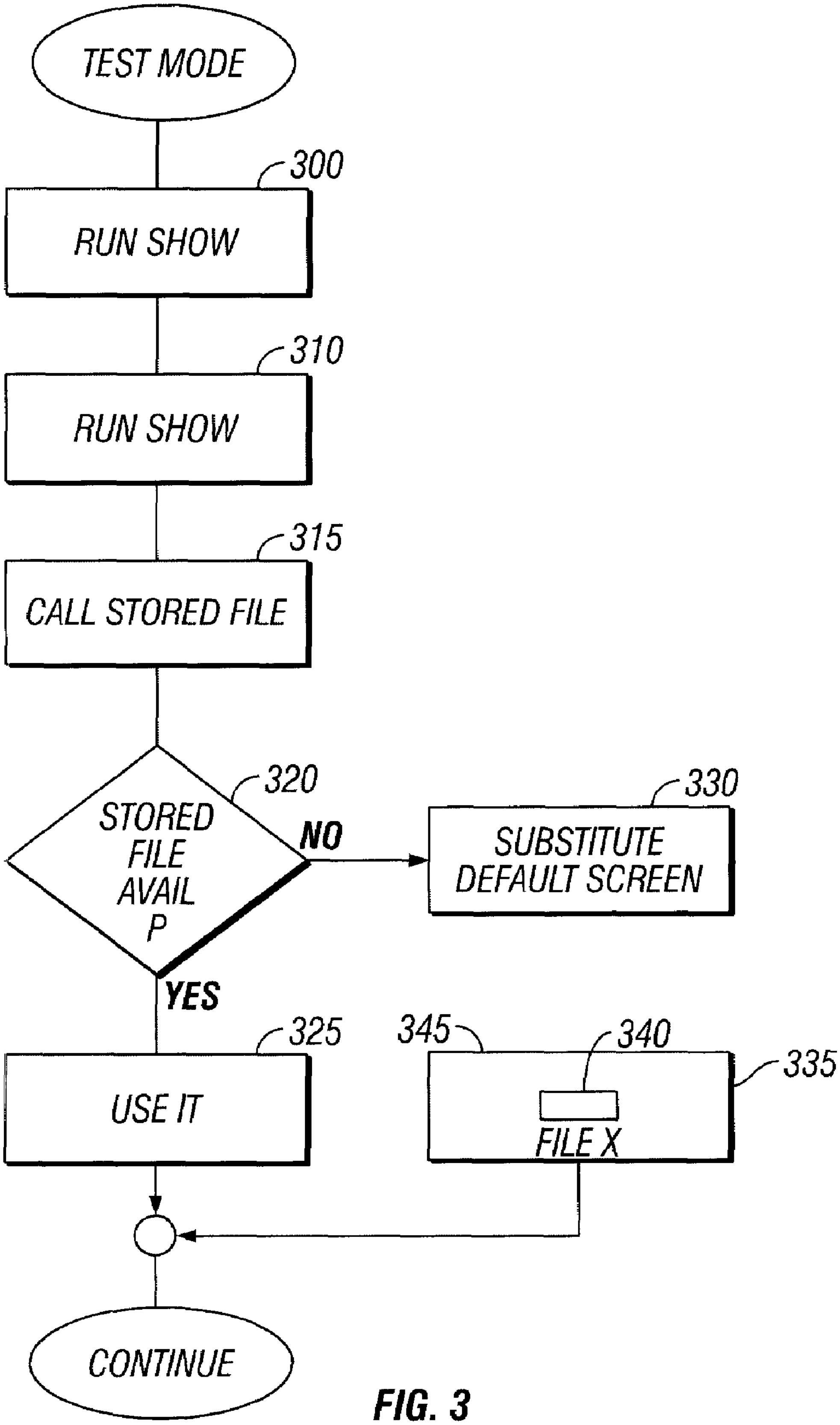
FIG. 3 shows a flowchart of operation of a special test mode.

In operation, the user/operator can select any of the files for part of the show. In addition, a show can be tested to determine if all the files needed for that show are available. The testing is carried out by entering a test mode which is shown in FIG. 3. In this test mode, the user commands that a show be run at 300. The processor begins running the show at 310 by calling up all necessary stored files and producing the layers representing those stored files with an output. The operation involves calling a stored file at 315. At 320, the system determines if the stored file is available. This may be done by searching the XML file for an index or by searching all files in the system. If the stored file is available, then the stored file is used and operation continues at 325. However, if the stored file is not available at 320, then a special default screen is substituted at 330. In an embodiment, the special default screen is as shown in 335; that is a black bar 340 shown on a white screen 345. A black bar preferably goes across approximately 70% of the screen both in width and in height directions. This default screen makes it very easy to determine which files are unavailable.

In an embodiment, the file name may also be alphanumerically placed on the default screen. The operation then continues to show the remainder of the show with the default screen in place of the missing file. A user reviewing this, however, may be able to determine, at a glance, that the default screen is present and therefore that a file is missing.

Although only a few embodiments have been disclosed in detail above, other modifications are possible. For example, other types of default screens may be used. In addition, other files besides those mentioned may be used, and also this system may be usable in other types of lighting instruments. For example, this system has been described as being used in a system in which the computer box which controls the image that is formed is separate from the projector that actually projects the image. However, the computer box 122 and projector 140 may be combined into a single device, such as the icon M device. In addition, while the above describes the projector as being a DMD based projector, other types of controlled projectors may also be used, including projectors based on grating light valves and the like.

All such modifications are intended to be encompassed within the following claims, in which:

What is claimed is:

1. A method, comprising:

obtaining a show, comprising a plurality of lighting effects, wherein each lighting effect includes at least one stored file representing operations to be carried out on the light;

testing the show by executing each of the lighting effects, by calling the stored files from memory within a computer system, displaying information indicative of the stored files if present, and displaying an error indication if the stored files are not present.

2. A method as in claim 1, wherein said error indication comprises a default screen with a bar shown across the screen in place of the lighting effect.

3. A method as in claim 1, wherein the error indication also includes a name of the file which is missing.

4. A method as in claim 1, wherein said testing comprises reading a plurality of different layers which collectively represent an effect, and combining said layers to produce an output signal, and displaying said output signal.

5. A method as in claim 4, wherein said displaying comprises displaying on a user interface.

6. A method as in claim 5, further comprising sharing the user interface between a plurality of different computers, each of said computers capable of testing the show within stored files within the local computer.

7. A method as in claim 1, wherein said testing the show comprises searching all files that are stored on a local computer system for files within the executed show.

8. A method as in claim 1, further comprising maintaining an index of files of lighting effects, and searching the index of files.

9. A system as in claim 8, further comprising a video processor, which processes said effects according to commands, and produces a signal indicative of said effects.

10. A system as in claim 9, wherein said signal is a signal adapted for controlling a projector which uses digital micromirror devices.

11. A system as in claim 9, wherein said signal includes at least one portion which represents an image whose outer shape has been shaped by one of said effects.

12. A system as in claim 9, wherein said video processor processes a plurality of said effects as a plurality of different layers.

13. A method as in claim 1, further comprising maintaining an XML file which includes information about lighting effects on the computer system, and searching the XML file for said lighting effects.

* * * * *